(12) United States Patent
Lindemann et al.

(10) Patent No.: US 12,188,529 B2
(45) Date of Patent: Jan. 7, 2025

(54) RADIALLY COMPLIANT CONNECTION

(71) Applicant: Schaeffler Technologies AG & Co. KG, Herzogenaurach (DE)

(72) Inventors: Patrick Lindemann, Wooster, OH (US); Matthew Payne, Glenmont, OH (US); Markus Steinberger, Sagamore Hills, OH (US); Jordan Geiser, Massillon, OH (US); Kenneth Hunt, Wooster, OH (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 501 days.

(21) Appl. No.: 17/519,648

(22) Filed: Nov. 5, 2021

(65) Prior Publication Data

US 2022/0299067 A1 Sep. 22, 2022

Related U.S. Application Data

(60) Provisional application No. 63/163,018, filed on Mar. 18, 2021.

(51) Int. Cl.
*F16D 3/64* (2006.01)
(52) U.S. Cl.
CPC .................................. *F16D 3/64* (2013.01)
(58) Field of Classification Search
CPC ... F16D 3/005; F16D 3/60; F16D 3/62; F16D 3/64; F16D 3/66; F16D 3/68

USPC ..................................... 464/82, 84, 100, 101
See application file for complete search history.

(56) References Cited

U.S. PATENT DOCUMENTS

| 268,807 | A | * | 12/1882 | Landis | F16D 3/60 |
| | | | | | 464/69 |
| 1,654,312 | A | * | 12/1927 | Trumpler | F16D 3/62 |
| | | | | | 464/84 |
| 1,657,844 | A | * | 1/1928 | Smith | F16D 3/62 |
| | | | | | 464/62.1 |
| 2,146,547 | A | * | 2/1939 | Lundgren | F16D 3/60 |
| | | | | | 464/81 |

(Continued)

FOREIGN PATENT DOCUMENTS

| CH | 318003 A | * 12/1956 | ............... F16D 3/62 |
| CN | 202132407 U | 2/2012 | |

(Continued)

*Primary Examiner* — Josh Skroupa

(57) ABSTRACT

A radially compliant connection includes an axis, a first plate with a first connection portion, a second plate with a second connection portion, an intermediate plate with third and fourth connection portions, a first flexible element fixed to the first connection portion and to the third connection portion, and a second flexible element fixed to the second connection portion and to the fourth connection portion. In some example embodiments, the first connection portion has a radially inner surface with a first radius, and the second connection portion has a first radially outer surface with a second radius, less than the first radius. In an example embodiment, the third connection portion has a second radially outer surface with a third radius, equal to the second radius, or the fourth connection portion has a third radially outer surface with a fourth radius, equal to the second radius.

20 Claims, 5 Drawing Sheets

(56) References Cited

U.S. PATENT DOCUMENTS

| | | | | |
|---|---|---|---|---|
| 3,246,485 | A | * | 4/1966 | Chapman .................. F16D 3/62 464/77 |
| 4,207,758 | A | * | 6/1980 | Stone ........................ F16D 3/60 464/69 |
| 4,850,933 | A | | 7/1989 | Osborn |
| 5,322,149 | A | * | 6/1994 | Szadkowski ............ F16D 13/68 464/84 |
| 7,571,784 | B2 | * | 8/2009 | Tashiro ..................... F16D 3/62 301/6.5 |
| 7,837,564 | B2 | * | 11/2010 | Farahati .................. F16D 1/076 464/84 |
| 10,247,249 | B2 | * | 4/2019 | Vogel ........................ F16D 3/12 |
| 2003/0232653 | A1 | | 12/2003 | Kirschey |
| 2008/0000706 | A1 | | 1/2008 | Tashiro et al. |
| 2013/0217511 | A1 | * | 8/2013 | Polifke ..................... F16D 3/12 464/101 |

FOREIGN PATENT DOCUMENTS

| | | | | |
|---|---|---|---|---|
| DE | 366938 | C | * 1/1923 | ............... F16D 3/62 |
| DE | 1284718 | B | * 12/1968 | ............... F16D 3/60 |
| DE | 1475488 | A1 | * 12/1969 | ............... F16D 3/62 |
| DE | 2504950 | A1 | * 8/1976 | ............... F16D 3/62 |
| DE | 3436599 | A1 | * 7/1985 | ............... F16D 3/60 |
| DE | 282960 | A5 | 9/1990 | |
| DE | 4315807 | C1 | * 12/1994 | ............... F16D 3/62 |
| DE | 102012223993 | A1 | 8/2013 | |
| EP | 0636805 | A1 | 2/1995 | |
| EP | 0724087 | A1 | * 7/1996 | ............... F16D 3/62 |
| FR | 1601575 | A | * 8/1970 | ............... F16D 3/62 |
| GB | 188066 | A | * 10/1922 | ............... F16D 3/60 |
| GB | 696378 | A | * 8/1953 | ............... F16D 3/62 |
| JP | H0626528 | A | 2/1994 | |
| JP | 2001065588 | A | 3/2001 | |
| JP | 2020085185 | A | 6/2020 | |

* cited by examiner

RADIALLY COMPLIANT CONNECTION

CROSS-REFERENCE TO RELATED APPLICATIONS

This application claims the benefit of U.S. Provisional Patent Application No. 63/163,018, filed Mar. 18, 2021, the disclosure of which is incorporated in its entirety by reference herein.

TECHNICAL FIELD

The present disclosure relates generally to a torque transmitting connection, and more specifically to a radially compliant connection.

BACKGROUND

Radially compliant connections are known. One example is shown in German Democratic Republic patent application publication no. DD 282 960 A5 titled Elastische Wellenkupplung zum Ausgleich von radialem Versatz (Elastic shaft coupling to compensate for radial misalignment) to Dr.-Ing. Helmut Strümpfel et al.

SUMMARY

Example embodiments broadly comprise a radially compliant connection including an axis, a first plate with a first connection portion, a second plate with a second connection portion, an intermediate plate with third and fourth connection portions, a first flexible element fixed to the first connection portion and to the third connection portion, and a second flexible element fixed to the second connection portion and to the fourth connection portion. In some example embodiments, the first connection portion has a radially inner surface with a first radius, and the second connection portion has a first radially outer surface with a second radius, less than the first radius. In an example embodiment, the third connection portion has a second radially outer surface with a third radius, equal to the second radius, or the fourth connection portion has a third radially outer surface with a fourth radius, equal to the second radius. In an example embodiment, the first flexible element or the second flexible element is disposed at a fifth radius, between the first radius and the second radius.

In some example embodiments, the first connection portion, the second connection portion, the third connection portion, and the fourth connection portion each extend in a circumferential direction and in an axial direction. In some example embodiments, the first connection portion forms a continuous rim. In an example embodiment, the continuous rim radially supports the first flexible element or the second flexible element. In an example embodiment, the continuous rim comprises respective openings at least partially radially aligned with the second connection portion and the fourth connection portion.

In some example embodiments, the radially compliant connection also includes exactly two first connection portions and exactly two second connection portions. In some example embodiments, the exactly two first connection portions are arranged circumferentially opposite one another, and the exactly two second connection portions are arranged circumferentially opposite one another. In an example embodiment, a first line extending through the exactly two first connection portions is orthogonal to a line extending through the exactly two second connection portions. In an example embodiment, the radially compliant connection also includes exactly two third connection portions and exactly two fourth connection portions.

In some example embodiments, the radially compliant connection also includes exactly four third connection portions and exactly four fourth connection portions. In an example embodiment, each one of the exactly four third connection portions is arranged on a same tab with a one of the exactly four fourth connection portions. In an example embodiment, the first flexible element is a first leaf spring arranged in a circumferential direction, includes distal ends fixed to respective ones of the exactly four third connection portions, and includes a middle portion arranged circumferentially between the distal ends and fixed to a respective one of the exactly two first connection portions. In an example embodiment, the second flexible element is a second leaf spring arranged in a circumferential direction, includes distal ends fixed to respective ones of the exactly four fourth connection portions, and includes a middle portion arranged circumferentially between the distal ends and fixed to a respective one of the exactly two second connection portions.

In an example embodiment, the first flexible element is a first leaf spring arranged in a circumferential direction and the second flexible element is a second leaf spring arranged in the circumferential direction. In some example embodiments, the first flexible element is a first leaf spring arranged with a first axial width greater than a first radial width, and the second flexible element is a second leaf spring arranged with a second axial width greater than a second radial width. In an example embodiment, the first leaf spring is fixed to the first connection portion by a first rivet and fixed to the third connection portion by a second rivet, and the second leaf spring is fixed to the second connection portion by a third rivet and fixed to the fourth connection portion by a fourth rivet.

In an example embodiment, the first plate includes a first annular portion, the second plate includes a second annular portion, and the intermediate plate includes a third annular portion arranged axially between the first annular portion and the second annular portion.

The disclosed embodiments allow flexibility in two perpendicular planes. The first plane is used for flexibility between an engine connection and the intermediate flange. The second plane (90° offset) is used for the flexibility between the intermediate flange and an emotor rotor carrier. This reduces transmittable radial forces to the bending stiffness of the leaf springs.

In order to allow for radial flexibility, leaf springs are arranged in the circumferential direction. This allows their softest bending to occur in the radial direction. The first leaf spring set is arranged in a pair 180° apart and connect from the engine side to an intermediate flange. The second leaf spring set connects the intermediate flange to an emotor rotor carrier. They are positioned on the intermediate flange so that their bending direction is 90° angled to that of the first leaf spring set.

In order to influence the deformation and therefore durability of the leaf springs, the intermediate flange and the second plate provide arced supports for the leaf spring when it is loaded in tension.

This design needs to transmit torque in drive as well as coast direction. To allow this, leaf springs can be arranged in pairs with opposite directions. This causes tension loading on one leaf spring when torque is transmitted in drive direction. Torque in coast direction causes tension loading on the opposite leaf spring.

The intermediate flange has no additional centering. It is located by the leaf spring connection to the engine side and the leaf spring connection to the rotor carrier. Both of which are centered by bearings or bushings.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
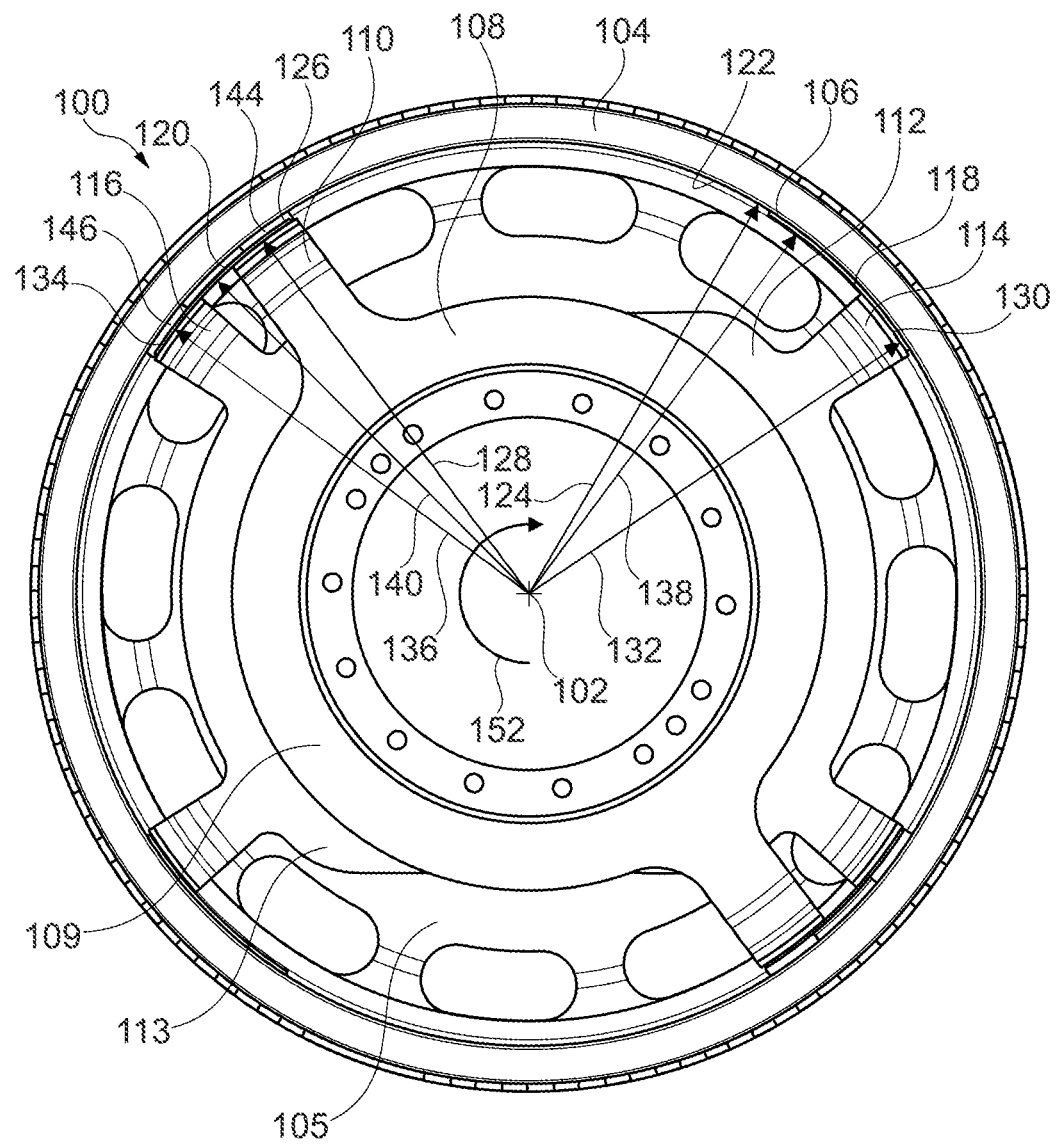
FIG. 1 illustrates a front view of a first embodiment of a radially compliant connection according to an example aspect of the present disclosure.
Figure 2:
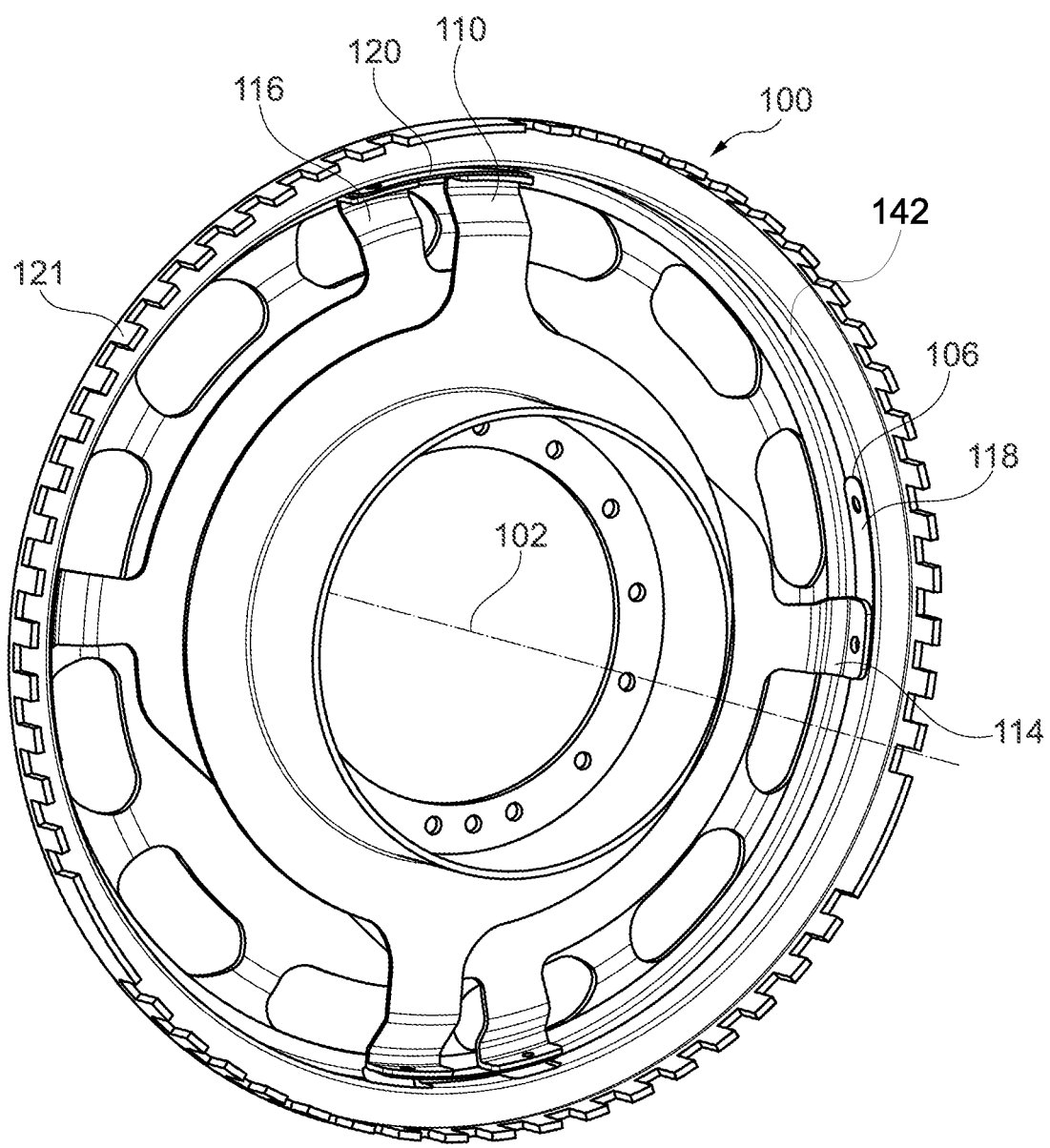
FIG. 2 illustrates a perspective view of the radially compliant connection of FIG. 1.

FIG. 1 is a front view of radially compliant connection 100. FIG. 2 is a perspective view of the radially compliant connection of FIG. 1. The following description is made with reference to FIGS. 1-2. Radially compliant connection 100 includes axis 102, plate 104 with connection portion 106, plate 108 with connection portion 110, and intermediate plate 112 with connection portions 114 and 116. Connection 100 also includes flexible element 118 fixed to connection portions 106 and 114, and flexible element 120 fixed to connection portions 110 and 116. Plate 104 is arranged for connecting to an engine crankshaft (not shown) and plate 108 is a portion of a rotor carrier for an electric motor (not shown), for example. Plate 104 includes axially extending teeth 121 forming a portion of a rotary position sensor or speed sensor, for example.

Connection portion 106 includes radially inner surface 122 with radius 124, and connection portion 110 includes radially outer surface 126 with radius 128, less than radius 124. Connection portion 114 includes radially outer surface 130 with radius 132, equal to radius 128, and connection portion 116 includes radially outer surface 134 with radius 136, equal to radius 128 and radius 132. Flexible elements 118 and 120 are disposed at respective radii 138 and 140, between radii 124 and 128.

Figure 3:
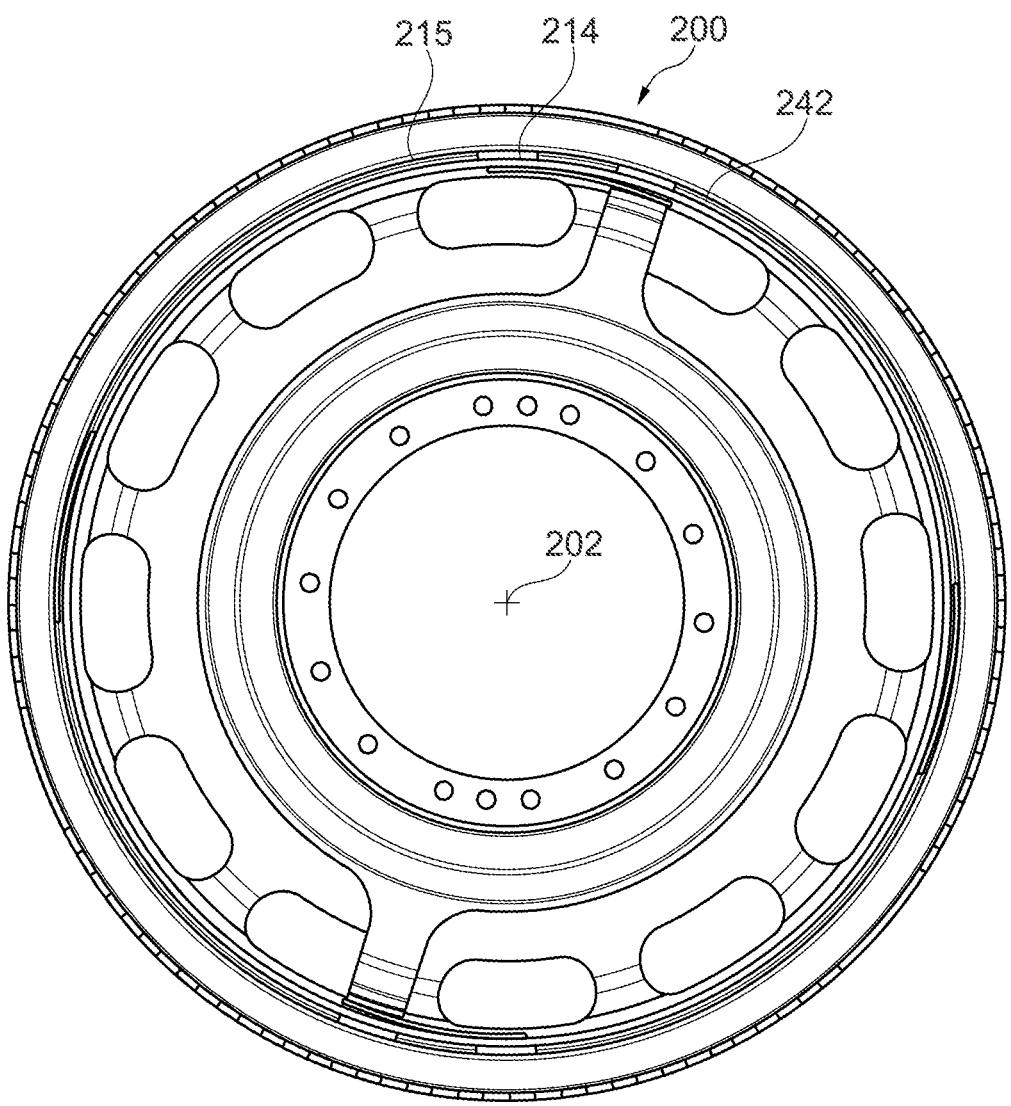
FIG. 3 illustrates a front view of a second embodiment of a radially compliant connection according to an example aspect of the present disclosure.
Figure 4:
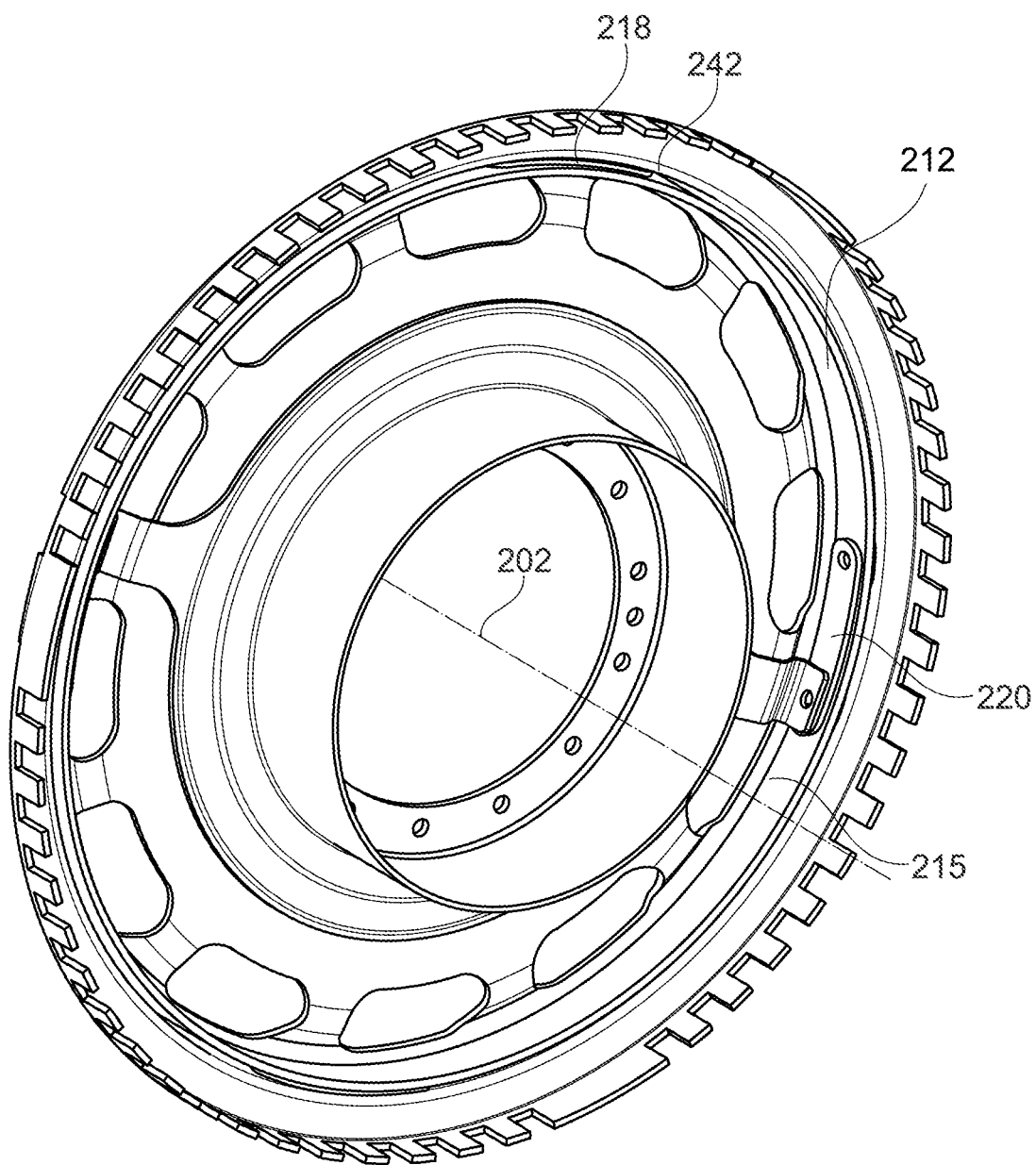
FIG. 4 illustrates a perspective view of the radially compliant connection of FIG. 3.

FIG. 3 illustrates a front view of radially compliant connection 200 according to an example aspect of the present disclosure. FIG. 4 illustrates a perspective view of the radially compliant connection of FIG. 3. The following description is made with reference to FIGS. 1-4. Radially compliant connection 200 is similar to radially compliant connection 100 with all 2XX labels corresponding to 1XX labels and description, except as noted below. Connection portions 106, 110, 114 and 116 each extend in a circumferential direction and in an axial direction. Connection portion 106 forms a portion of continuous rim 142. Similarly, as shown in FIGS. 3 and 4, connection portion 214 is a portion of continuous rim 215. That is, intermediate plate 212 has a ring shape instead of having radially extending tabs like intermediate plate 112.

As shown in FIGS. 1-2, rim 142 radially supports flexible elements 118 and 120. Similarly, as shown in FIGS. 3-4, rim 242 radially supports flexible element 218 and rim 215 radially supports flexible element 220. Continuous rim 142 includes openings 144 and 146 at least partially radially aligned with connection portions 110 and 116, respectively. Radially compliant connection 100 includes exactly two connection portions 106 arranged circumferentially opposite one another, and exactly two connection portions 110 arranged circumferentially opposite one another. Radially compliant connection 100 also includes exactly two connection portions 114 and exactly two connection portions 116.

Figure 5:
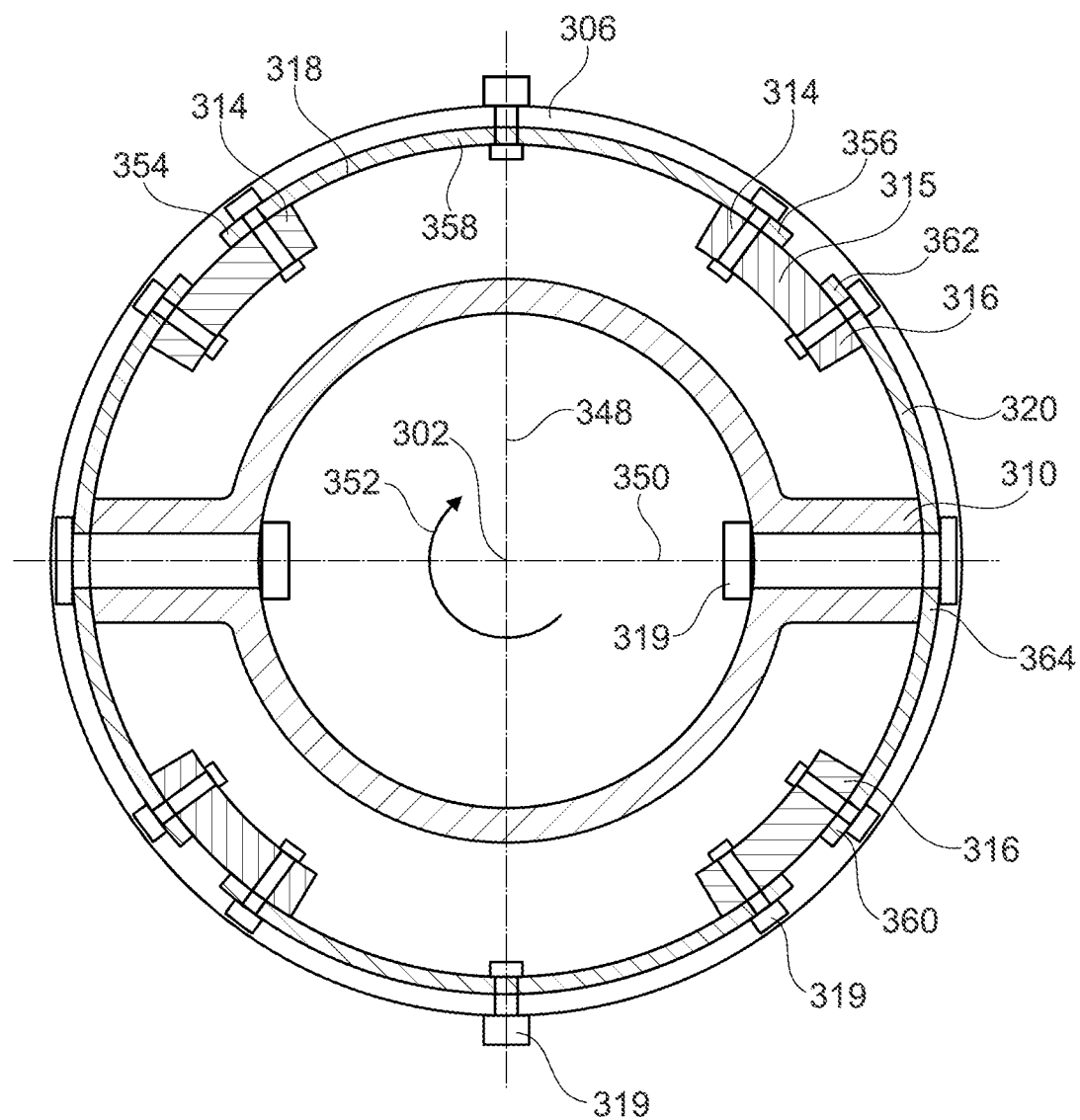
FIG. 5 illustrates a front view of a third embodiment of a radially compliant connection according to an example aspect of the present disclosure.

FIG. 5 illustrates a front view of radially compliant connection 300 according to an example aspect of the present disclosure. Radially compliant connection 300 is similar to radially compliant connection 100 with all 3XX reference numerals corresponding to 1XX reference numerals and description, except as noted below. The following description is made with reference to FIG. 5. Line 348 extending through connection portions 306 is orthogonal to line 350 extending through connection portions 310. Radially compliant connection 300 includes exactly four connection portions 314 and exactly four connection portions 316. Each one of connection portions 314 is arranged on a same tab 315 with one of connection portions 316

Flexible element 318 is a leaf spring arranged in circumferential direction 352 with distal ends 354 and 356 fixed to respective connection portions 314 and middle portion 358 arranged circumferentially between the distal ends and fixed to connection portion 306. Similarly, flexible element 320 is a leaf spring arranged in the circumferential direction with distal ends 360 and 362 fixed to respective connection portions 316 and middle portion 364 arranged circumferentially between the distal ends and fixed to connection portion 310.

Returning to FIG. 1, flexible element 118 a leaf spring arranged in circumferential direction 152 and flexible element 120 is a leaf spring arranged in the circumferential direction. Flexible element 118 and 120 are leaf springs arranged with axial widths greater than radial widths. Leaf springs 118 and 120 are fixed to the respective connection portions by rivets (not shown, ref. rivets 319 fixing leaf springs 318 and 320 in FIG. 5). Plate 104 includes annular portion 105, plate 108 includes annular portion 109, and intermediate plate 112 includes annular portion 113 arranged axially between portions 105 and 109.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Radially compliant connection
102 Axis
104 Plate (first)
105 Annular portion
106 Connection portion (first)
108 Plate (second)
109 Annular portion
110 Connection portion (second)
112 Intermediate plate
113 Annular portion
114 Connection portion (third)
116 Connection portion (fourth)
118 Flexible element (first)
120 Flexible element (second)
121 Axially extending teeth
122 Radially inner surface
124 Radius (first)
126 Radially outer surface (first)
128 Radius (second)
130 Radially outer surface (second)
132 Radius (third)
134 Radially outer surface (third)
136 Radius (fourth)
138 Radius (fifth)
140 Radius (sixth)
142 Continuous rim
144 Opening (first)
146 Opening (second)
152 Circumferential direction
200 Radially compliant connection
202 Axis
214 Connection portion
215 Continuous rim
218 Flexible element
220 Flexible element
242 Continuous rim
300 Radially compliant connection
302 Axis
318 Flexible element
319 Rivet
320 Flexible element
348 Line (first)
350 Line (second)
352 Circumferential direction
354 Distal end (flexible element 318)
356 Distal end (flexible element 318)
358 Middle portion (flexible element 318)
360 Distal end (flexible element 320)
362 Distal end (flexible element 320)
364 Middle portion (flexible element 320)

What is claimed is:

1. A radially compliant connection, comprising:
an axis;
a first plate comprising a first connection portion;
a second plate comprising a second connection portion;
an intermediate plate comprising a third connection portion and a fourth connection portion;
a first flexible element fixed to the first connection portion and to the third connection portion, wherein the first flexible element is a first leaf spring arcuately formed in a circumferential direction and having a first axial width greater than a first radial width; and
a second flexible element fixed to the second connection portion and to the fourth connection portion, wherein the second flexible element is a second leaf spring arcuately formed in the circumferential direction and having a second axial width greater than a second radial width.

2. The radially compliant connection of claim 1 wherein:
the first connection portion comprises a radially inner surface with a first radius; and
the second connection portion comprises a first radially outer surface with a second radius, less than the first radius.

3. The radially compliant connection of claim 2 wherein:
the third connection portion comprises a second radially outer surface with a third radius, equal to the second radius; or
the fourth connection portion comprises a third radially outer surface with a fourth radius, equal to the second radius.

4. The radially compliant connection of claim 2 wherein:
the first flexible element or the second flexible element is disposed at a fifth radius, between the first radius and the second radius.

5. The radially compliant connection of claim 1 wherein the first connection portion, the second connection portion, the third connection portion, and the fourth connection portion each extend in a circumferential direction and in an axial direction.

6. The radially compliant connection of claim 5 wherein the first connection portion forms a continuous rim.

7. The radially compliant connection of claim 6 wherein the continuous rim radially supports the first flexible element or the second flexible element.

8. The radially compliant connection of claim 6 wherein the continuous rim comprises respective openings at least partially radially aligned with the second connection portion and the fourth connection portion.

9. The radially compliant connection of claim 1 further comprising:
    exactly two first connection portions; and
    exactly two second connection portions.

10. The radially compliant connection of claim 9 wherein:
    the exactly two first connection portions are arranged circumferentially opposite one another; and
    the exactly two second connection portions are arranged circumferentially opposite one another.

11. The radially compliant connection of claim 10 wherein a first line extending through the exactly two first connection portions is orthogonal to a line extending through the exactly two second connection portions.

12. The radially compliant connection of claim 9 further comprising:
    exactly two third connection portions; and
    exactly two fourth connection portions.

13. The radially compliant connection of claim 9 further comprising:
    exactly four third connection portions; and
    exactly four fourth connection portions.

14. The radially compliant connection of claim 13 wherein each one of the exactly four third connection portions is arranged on a same tab with a one of the exactly four fourth connection portions.

15. The radially compliant connection of claim 13 wherein:
    the first flexible element:
    comprises distal ends fixed to respective ones of the exactly four third connection portions; and
    comprises a middle portion arranged circumferentially between the distal ends and fixed to a respective one of the exactly two first connection portions.

16. The radially compliant connection of claim 13 wherein:
    the second flexible element:
    comprises distal ends fixed to respective ones of the exactly four fourth connection portions; and
    comprises a middle portion arranged circumferentially between the distal ends and fixed to a respective one of the exactly two second connection portions.

17. The radially compliant connection of claim 1 wherein:
    the first leaf spring is:
        fixed to the first connection portion by a first rivet; and
        fixed to the third connection portion by a second rivet; and
    the second leaf spring is:
        fixed to the second connection portion by a third rivet; and
        fixed to the fourth connection portion by a fourth rivet.

18. The radially compliant connection of claim 17 wherein the first rivet, the second rivet, the third rivet and the fourth rivet are axially aligned and circumferentially offset from one another.

19. The radially compliant connection of claim 1 wherein:
    the first plate comprises a first annular portion;
    the second plate comprises a second annular portion; and
    the intermediate plate comprises a third annular portion arranged axially between the first annular portion and the second annular portion.

20. The radially compliant connection of claim 1 wherein the first connection portion, the second connection portion, the third connection portion and the fourth connection portion are axially aligned and circumferentially offset from one another.

* * * * *